United States Patent [19]

Krick

[11] Patent Number: 5,781,774
[45] Date of Patent: Jul. 14, 1998

[54] PROCESSOR HAVING OPERATING MODES FOR AN UPGRADEABLE MULTIPROCESSOR COMPUTER SYSTEM

[75] Inventor: Robert F. Krick, Beaverton, Oreg.

[73] Assignee: Intel Corporation, Santa Clara, Calif.

[21] Appl. No.: 711,318

[22] Filed: Sep. 3, 1996

Related U.S. Application Data

[63] Continuation of Ser. No. 268,223, Jun. 29, 1994, abandoned.

[51] Int. Cl.⁶ .................................................. G06F 13/00
[52] U.S. Cl. ...................................... 395/651; 395/653
[58] Field of Search ............................... 395/282, 284, 395/651, 653

[56] References Cited

U.S. PATENT DOCUMENTS

| | | | |
|---|---|---|---|
| 4,660,141 | 4/1987 | Ceccon et al. | 364/200 |
| 5,276,864 | 1/1994 | Hernandez et al. | 395/575 |
| 5,297,260 | 3/1994 | Kametani | 395/325 |
| 5,297,272 | 3/1994 | Lu et al. | 395/500 |
| 5,321,827 | 6/1994 | Lu et al. | 395/500 |
| 5,359,715 | 10/1994 | Heil et al. | 395/325 |
| 5,388,224 | 2/1995 | Maskas | 395/325 |
| 5,455,927 | 10/1995 | Huang | 395/500 |
| 5,490,279 | 2/1996 | Golbert et al. | 395/800 |

Primary Examiner—Tod R. Swann
Assistant Examiner—Christopher S. Chow
Attorney, Agent, or Firm—Blakely, Sokoloff, Taylor & Zafman

[57] ABSTRACT

A processor for an upgradable system is disclosed having a type pin that indicates whether the processor is coupled as an OEM processor in a single processor or a dual processor computer system or as an upgrade processor in the dual processor computer system. The type pin causes the appropriate enable and disable of a cache coherency mechanism and a bus arbitration mechanism in the processor and coordination of a dual processor boot-up handshake.

13 Claims, 6 Drawing Sheets

PROCESSOR HAVING OPERATING MODES FOR AN UPGRADEABLE MULTIPROCESSOR COMPUTER SYSTEM

This is a continuation of application Ser. No. 08/268,223, filed Jun. 29, 1994, now abandoned.

BACKGROUND OF THE INVENTION

1. Field of the Invention

The present invention pertains to the field of computer systems. More particularly, this invention relates to a processor that functions in multiple operating modes for an upgradable computer system.

2. Background

Prior conventional computer systems typically provide a single central processing unit. In such a system, the central processing unit typically fetches an instruction stream from a memory subsystem over a system bus and executes each instruction in the instruction stream. The execution of instruction stream usually generates data structures that are maintained in the memory subsystem.

Such a system may also include a cache memory that provides high bandwidth access to the memory subsystem for the central processing unit Such a cache memory is typically referred to as a level one (L1) cache. In addition, such a prior system may implement the L1 cache on the same integrated circuit chip as the central processing unit. Such a central processing unit with an integrated L1 cache typically includes a cache controller that maintains coherency between the data stored in the internal L1 cache and the corresponding data in the external memory subsystem.

Other prior computer systems may provide multiple central processing units to improve instruction execution performance. In such a multiprocessor system, the central processing units are typically coupled to a system bus which provides communication to a memory subsystem and various I/O subsystems of the computer system. Such a multiprocessor system usually yields improved instruction execution performance over a single processor system because the instruction execution functions are shared among the multiple central processing units.

In such a prior multiprocessor system, each central processing unit is commonly associated with a corresponding L1 cache that provides high bandwidth access to the memory subsystem. Each L1 cache may be implemented on the same integrated circuit die with the corresponding central processing unit.

Such a multiprocessor computer system typically provides mechanisms for sharing the external memory subsystem, the external I/O devices, and the system bus among the central processing units. In addition, such a multiprocessor computer system usually implements a mechanism for maintaining cache coherency among the L1 caches for each central processing unit and the external memory.

The mechanisms in such prior multiprocessor systems for arbitrating and sharing the system bus and for maintaining cache coherency typically require complex external hardware. For example, such a prior multiprocessor system usually implements a bus arbitration subsystem for access to the system bus and a memory controller subsystem for controlling the external memory and maintaining system wide cache coherency. Such complex external hardware typically increases the cost of such a multiprocessor computer system in comparison to the cost of a single processor computer system.

A typical prior single processor computer system requires extensive hardware modifications for upgrade into a multiprocessor computer system. Such an upgrade typically requires that entire central processing unit circuit boards be replaced or that additional multiprocessor boards be added to the computer system. Unfortunately, such complex and intricate upgrade requirements can render an upgrade from a single processor to a multiprocessor computer system impractical. A computer system user must typically purchase entirely new processor circuit boards or even an entirely new computer system to obtain the benefits in performance of a multiprocessor computer system.

SUMMARY AND OBJECTS OF THE INVENTION

One object of the present invention is to provide a processor capable of functioning in a single processor mode or a multiprocessor mode according to an input pin.

Another object of the present invention is to provide a processor capable of functioning as either an original equipment manufacturer (OEM) processor in a single processor computer system or a multiprocessor computer system or as an upgrade processor in a multiprocessor computer system according to an input pin.

Another object of the present invention is to provide a processor that enables and disables internal bus arbitration and cache coherency mechanisms according to an operating mode determined by an input pin.

A further object of the present invention is to provide a processor that performs a multiprocessor initialization handshake according to an operating mode determined by an input pin.

Another object of the present invention is to provide a processor that initializes in a bus ownership mode according to an operating mode determined by an input pin.

Another object of the present invention is to provide a processor that determines a programmable interrupt controller identifier according to an operating mode determined by an input pin.

These and other objects of the invention are provided by a processor having a type pin that indicates whether the processor is coupled as an OEM processor, a single processor, or a dual processor computer system, or as an upgrade processor in the dual processor computer system. The type pin enables and disables a cache coherency mechanism in the processor. The type pin also enables and disables a bus arbitration mechanism in the processor. The processor samples an interrupt identifier on a set of signal lines, and inverts a least significant bit of the interrupt identifier if the type pin indicates that the processor is the upgrade processor. The processor assumes a most recent master mode at reset if the type pin indicates that the processor is the OEM processor, and assumes a least recent master mode at reset if the type pin indicates that the processor is the upgrade processor. The processor transmits a serial identifier over a signal line that indicates the presence of the upgrade processor in the dual processor computer system if the type pin indicates that the processor is the upgrade processor. The processor transfers a startup interprocessor interrupt over an interrupt bus to startup an upgrade processor if the type pin indicates that the processor is the OEM processor.

Other objects, features and advantages of the present invention will be apparent from the accompanying drawings, and from the detailed description that follows below.

DESCRIPTION OF THE DRAWINGS

The present invention is illustrated by way of example and not limitation in the figures of the accompanying drawings in which like references indicate similar elements, and in which.

3

DETAILED DESCRIPTION

Figure 1:
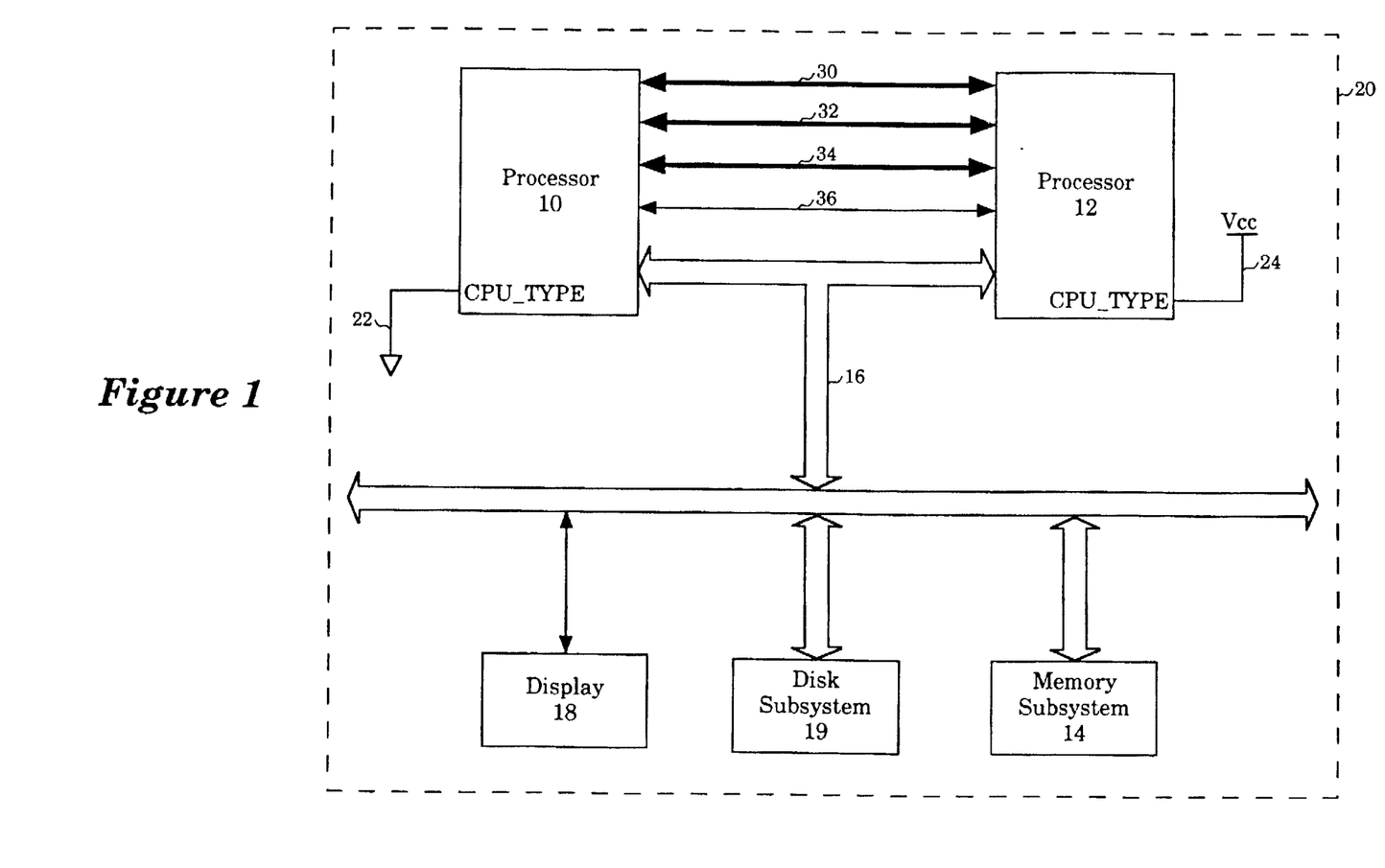
FIG. 1 illustrates a computer system for one embodiment which comprises a pair of processors, a memory subsystem, a display and a disk subsystem.

FIG. 1 illustrates a computer system 20 for one embodiment. The computer system 20 comprises a pair of processors 10 and 12, a memory subsystem 14, a display 18 and a disk subsystem 19. The processors 10 and 12 communicate with the memory subsystem 14 and input/output devices such as the disk subsystem 19 and the display 18 over a system bus 16.

The processor 10 is substantially similar to the processor 12. The processors 10 and 12 each function in either an original equipment manufacture (OEM) mode or a dual processor upgrade mode. The OEM mode or the dual processor upgrade mode for the processors 10 and 12 is controlled by a CPU_TYPE pin of each of the processors 10 and 12.

The CPU_TYPE pin 22 of the processor 10 is coupled to a low voltage node of the computer system 20. The low voltage on the CPU_TYPE pin 22 causes the processor 10 to function in the OEM processor mode. The CPU_TYPE pin 24 of the processor 12 is coupled to Vcc voltage of the computer system 20. The high voltage on the CPU_TYPE pin 24 causes the processor 12 to function in the dual processor upgrade mode.

The processors 10 and 12 each contain an internal interrupt controller. The internal interrupt controllers of the processors 10 and 12 communicate via an interrupt bus 30. The interrupt bus 30 may also be coupled to an external interrupt controller (not shown) to communicate interrupt information for external devices.

The interrupt bus 30 includes a PIC_DATA_0 signal that functions as a dual processor enable signal from the upgrade processor 12 to the OEM processor 10 at reset. The OEM processor 10 samples the PIC_DATA_0 signal on the falling edge of a reset signal on the system control lines 36. If the sampled PIC_DATA_0 signal from the upgrade processor 12 is low at reset, then the OEM processor 10 functions in a dual processor mode. If the upgrade processor 12 is not present to drive PIC_DATA_0 at reset, then the OEM processor 10 functions in a single processor mode.

The processors 10 and 12 each contain an internal level one (L1) cache memory and an associated cache memory controller. The cache memory controllers in the processors 10 and 12 communicate via a set of cache control lines 32. The cache control lines 32 enable the processors 10 and 12 to maintain internal L1 cache consistency with the data stored in the memory subsystem 14.

The processors 10 and 12 each contain an internal bus interface circuit for communication over the system bus 16. The internal bus interface circuits of the processors 10 and 12 coordinate ownership of the system bus 16 via a set of arbitration lines 34. The arbitration lines 34 include a request line and a grant line that enable the processors 10 and 12 to request ownership of the system bus 16, to acquire ownership of the system bus 16 as bus master, and to relinquish control over the system bus 16.

The processors 10 and 12 are also coupled to a set of system control lines 36. The system control lines 36 provide system status information to the processors 10 and 12. The system control lines 36 include a reset line that resets both processors 10 and 12.

The processor 10 is in the OEM processor mode as determined by the low voltage on the CPU_TYPE pin 22 and the processor 12 is in the upgrade processor mode as determined by the high voltage on the CPU_TYPE pin 24. The OEM processor 10 fetches an instruction from a fixed memory address after the reset signal is asserted on the system control lines 36. The OEM processor 10 boots starting from the fixed memory address. Thereafter, the OEM processor 10 transfers a start-up interprocessor interrupt to the upgrade processor 12 over the interrupt bus 30. The start-up interprocessor interrupt causes the upgrade processor 12 to boot up.

The OEM processor 10 boots up in a most recent master (MRM) bus arbitration mode. The MRM mode on boot up provides the OEM processor 10 immediate control over the system bus 16 on boot up. The upgrade processor 12, on the other hand, boots up in a least recent master (LRM) bus arbitration mode. The LRM mode on boot up requires that the upgrade processor 12 request and arbitrate for control of the system bus 16 on boot up using the arbitration lines 34.

The upgrade processor 12 transmits a serial identifier to the OEM processor 10 over one of the cache control lines 32 during boot up of the upgrade processor 12. The serial identifier from the upgrade processor 12 identifies the presence of the upgrade processor 12 to the OEM processor 10. For one embodiment, the serial identifier comprises an 8 bit serial bit stream that identifies the upgrade processor 12.

The serial identifier from the upgrade processor 12 causes the OEM processor 10 to enable the internal bus arbitration mechanism for the system bus 16 and the internal cache coherency mechanism for the internal L1 cache memory of the OEM processor 10. The internal bus arbitration mechanism and the internal cache coherency mechanism for the internal L1 cache memory of the upgrade processor 12 is always enabled in the dual processor upgrade mode as determined by the CPU_TYPE pin 24.

The processors 10 and 12 each implement a cpu_type instruction that generates a 16 bit value that identifies a type of processor. The cpu_type instruction returns a bit that indicates the state of the corresponding CPU_TYPE pin. The cpu[]type instruction enables software executing on the processors 10 and 12 to identify each as either an OEM processor or an upgrade processor.

Figure 2:
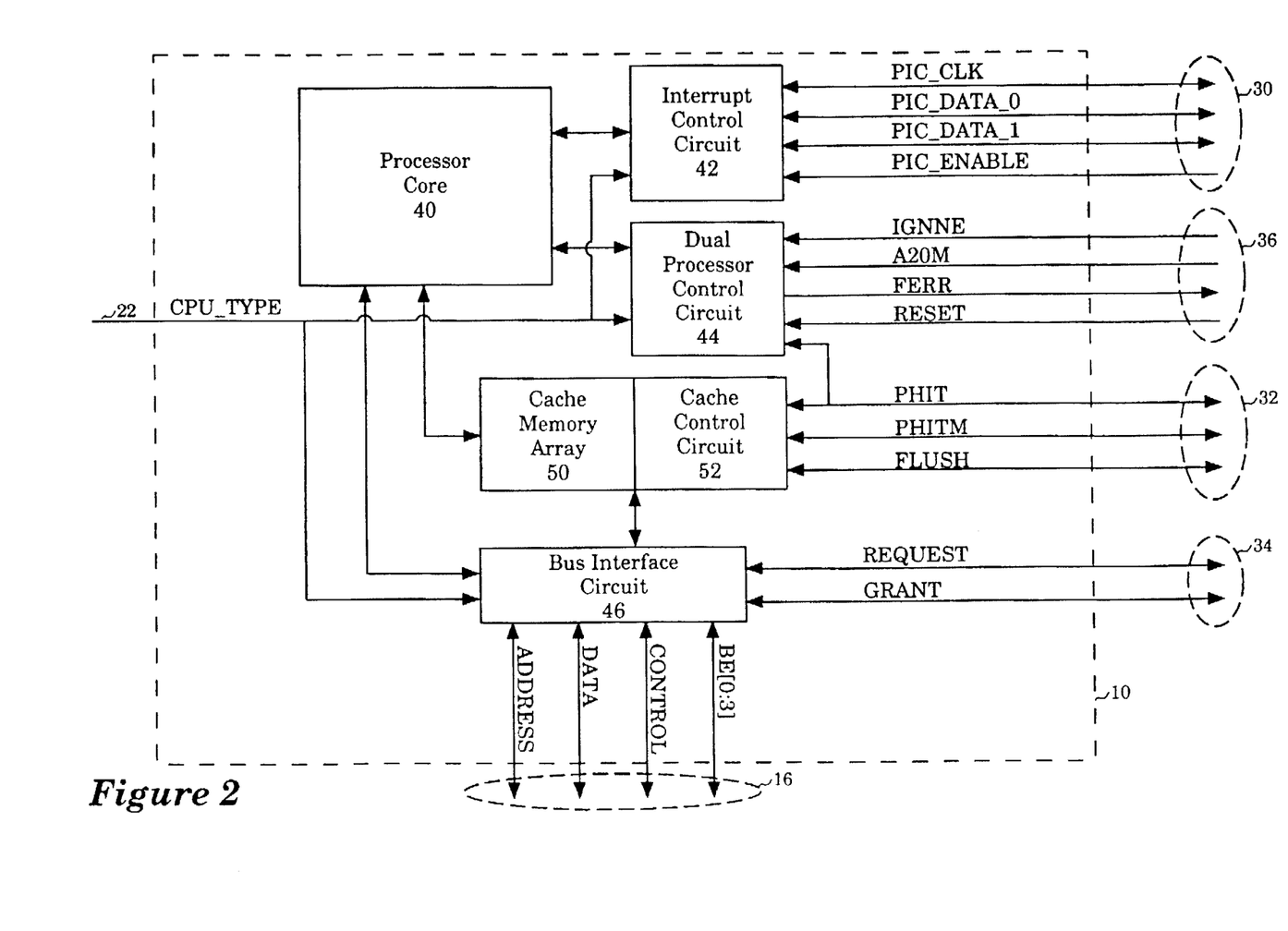
FIG. 2 illustrates an original equipment manufacturer (OEM) mode processor for one embodiment which comprises a processor core, an interrupt control circuit, a dual processor control circuit, a bus interface circuit, and an internal L1 cache.

FIG. 2 illustrates the processor 10 for one embodiment. The processor 10 comprises a processor core 40, an interrupt control circuit 42, a dual processor control circuit 44, and a bus interface circuit 46. The processor 10 further comprises an L1 cache memory that includes a cache memory array 50 and a cache control circuit 52.

The processor core 40 comprises instruction fetch circuitry, instruction decode circuitry, and a set of execution circuits for executing the fetched instructions. For one embodiment the processor core 40 fetches and executes instructions according to the Intel Microprocessor Architecture.

The interrupt control circuit 42 senses the state of the CPU_TYPE pin 22 and is coupled to the interrupt bus 30. The interrupt bus 30 comprises a programmable interrupt controller clock (PIC_CLK) signal line, and a pair of programmable interrupt controller data lines PIC_DATA_0 and PIC_DATA_1. The interrupt bus 30 also comprises a programmable interrupt controller enable (PIC_ENABLE) signal line. The interrupt control circuit 42 receives messages over the interrupt bus 30 that indicate external hardware interrupts for the computer system 20 according to a programmable interrupt controller identifier for the processor 10. The interrupt control circuit 42 transfers the start-up interprocessor interrupt over the interrupt bus 30 that causes the upgrade processor 12 to startup according to the state of the CPU_TYPE pin 24.

The cache control lines 32 comprise a hit (PHIT) signal line, a modified hit (PHITM) signal line, and a cache flush (FLUSH) signal line. The cache control lines 32 are used to maintain cache coherency between the internal L1 cache of the processor 10, the internal L1 cache of the processor 12, and the data in the memory subsystem 14. The cache control circuit 52 uses the PHIT and the PHITM signal lines to indicate the state of cache lines stored in the cache memory array 50 during snoop phases of data transfer over the system bus 16.

The arbitration lines 34 comprise a request (REQUEST) signal line, and a grant (GRANT) signal line. The bus interface circuit 46 uses the request and grant signal lines to request and obtain control over the system bus 16 as a bus master and thereafter to relinquish control over the system bus 16. The states of the CPU_TYPE pins 22 and 24 control the initial bus ownership states of the processors 10 and 12, respectively.

The system bus 16 comprises a set of address (ADDRESS) signal lines, a set of data (DATA) signal lines and a set of control (CONTROL) signal lines. The system bus 16 further comprises a set of byte enable (BE[0:3]) signal lines that indicate valid bytes transferred over the data lines of the system bus 16. The byte enable lines on the system bus 16 are also used to provide a programmable interrupt controller identifier (PIC_ID) for the interrupt control circuit 42. The PIC_ID is latched by the bus interface circuit 46 on the rising edge of a reset signal of the system control lines 36. The PIC_ID is driven onto the byte enable signal lines on reset by external hardware (not shown) coupled to the system bus 16.

The dual processor control circuit 44 samples the state of the CPU_TYPE pin 22 to determine whether the processor 10 functions in the OEM processor mode or the dual processor upgrade mode. The dual processor control circuit 44 also enables reception of the serial identifier message from the processor 12 over the PHIT signal line of the cache control lines 32 during initialization of the computer system 20.

The dual processor control circuit 44 is coupled to the system control lines 36. The system control lines 36 include an ignore numeric error (IGNNE) signal line, an address twenty mask (A20M) signal line, and a floating point error (FERR) signal line. The dual processor control circuit 44 enables communication of the states of the IGNNE, A20M, and FERR signal lines between the system control lines 36 and the processor core 40 if the CPU_TYPE pin 22 indicates that the processor 10 is in the OEM processor mode.

Figure 3:
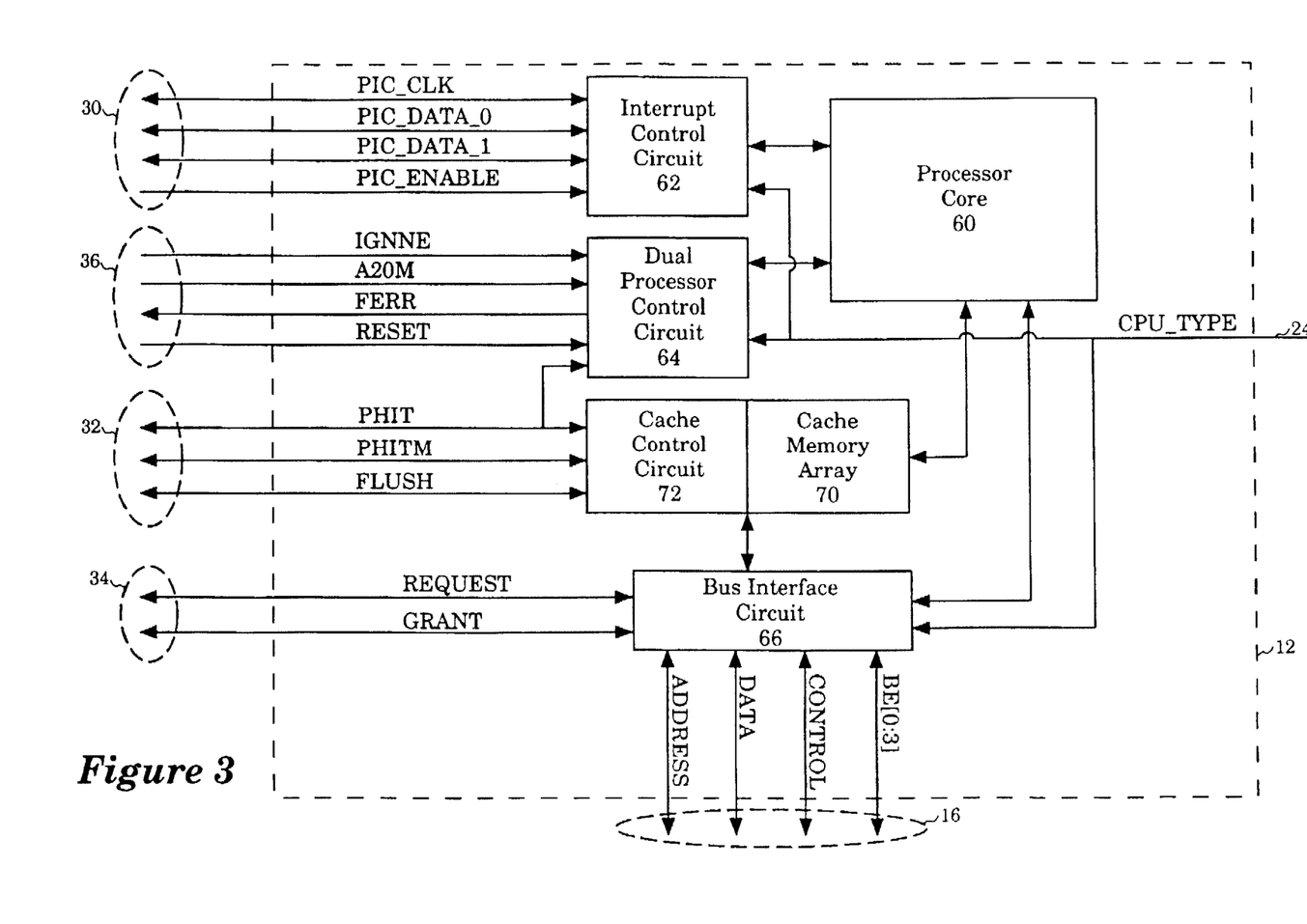
FIG. 3 illustrates an upgrade mode processor for one embodiment which comprises a processor core, an interrupt control circuit, a dual processor control circuit, a bus interface circuit, and an internal L1 cache.

FIG. 3 illustrates the processor 12 for one embodiment. The processor 12 is substantially similar to the processor 10. The high level of the CPU_TYPE pin 24 to the processor 12 causes the processor 12 to function in the dual processor upgrade mode. The processor 12 comprises a processor core 60, an interrupt control circuit 62, a dual processor control circuit 64, a bus interface circuit 66, and an internal L1 cache comprising a cache memory array 70 and a cache control circuit 72.

The processor core 60 comprises instruction fetch circuitry, instruction decode circuitry, and a set of execution circuits for executing the fetched instructions. For one embodiment the processor core 60 fetches and executes instructions according to the Intel Microprocessor Architecture.

The interrupt control circuit 62 is coupled to the interrupt bus 30. The interrupt control circuit 62 receives messages over the interrupt bus 30 that indicate external hardware interrupts for the computer system 20 according to the PIC_ID for the processor 12. The interrupt control circuit 62 also enables reception of the start-up interprocessor interrupt from the OEM processor 10 over the interrupt bus 30 that causes the upgrade processor 12 to startup.

The cache control circuit 72 uses the PHIT and the PHITM signal lines to indicate the state of cache lines stored in the cache memory array 70 during snoop phases of data transfer over the system bus 16. The bus interface circuit 66 uses the request and grant signal lines to request and obtain control over the system bus 16 as a bus master and thereafter to relinquish control over the system bus 16.

The byte enable lines on the system bus 16 are used to provide a programmable interrupt controller identifier (PIC_ID) for the interrupt control circuit 62. The bus interface circuit 66 samples the byte enable signal lines of the system bus 16 on the falling edge of the reset signal on the system control lines 36. The CPU_TYPE pin 24 in the dual processor upgrade mode causes the bus interface circuit 66 to invert the least significant bit of the PIC_ID sampled on the byte enable signal lines of the system bus 16. The inversion the least significant bit of the PIC_ID on the byte enable signals of the system bus 16 ensures that the OEM processor 10 and the upgrade processor 12 have different PIC_IDs for communication over the interrupt bus 30.

The dual processor control circuit 64 samples the state of the CPU_TYPE pin 24 to determine whether the processor 12 functions in the OEM processor mode or the dual processor upgrade mode. The dual processor control circuit 64 also transfers the serial identifier message to the upgrade processor 10 over the PHIT signal line of the cache control lines 32 during initialization of the computer system 20. The high voltage level on the CPU_TYPE pin 24 causes the dual processor control circuit 64 to ignore the IGNNE, the A20M signal lines, and to not drive the FERR signal line on the system control lines 36.

Figure 4:
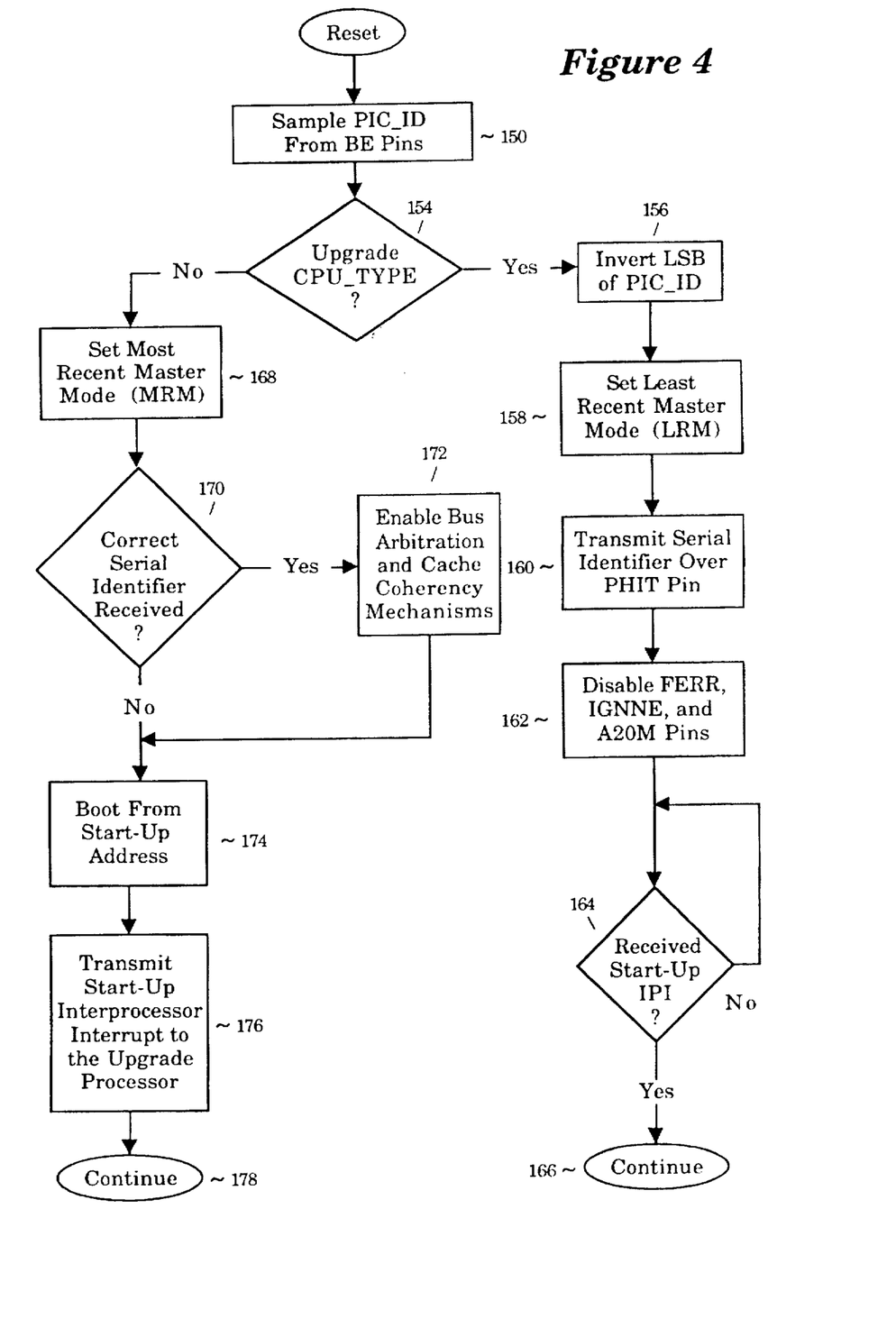
FIG. 4 shows an initialization sequence for the OEM and upgrade processors for one embodiment.

FIG. 4 illustrates the initialization sequence for the processors 10 and 12 for one embodiment. At state 150, the reset signal line of the system lines 36 is asserted. On the falling edge of the reset signal at block 152, the processors 10 and 12 each sample an interrupt or pic identifier PIC_ID from the corresponding byte enable pins coupled to the byte enable signal lines of the system bus 16.

At decision block 154, if the CPU_TYPE pin of the processor 10 or 12 indicates the dual processor upgrade mode, then control proceeds to block 156 in the dual processor upgrade mode. Otherwise control proceeds to block 168 in the OEM processor mode.

In the dual processor upgrade mode at block 156, the processor 12 inverts the least significant bit of the PIC_ID sampled during block 152. The inverted least significant bit of the PIC_ID insures that the processors 10 and 12 do not have the same PIC_ID, thereby preventing miscommunication over the interrupt bus 30.

Thereafter at block 158, the processor 12 internally sets the least recent master (LRM) mode. The LRM mode indicates that the processor 12 must request and acquire control over the system bus 16 using the arbitration lines 34 before initiating a bus transaction over the system bus 16.

At block 160, the processor 12 transmits a serial identifier over the PHIT signal line of the cache control lines 32. The serial identifier indicates the presence of the upgrade processor 12 and causes the OEM processor 10 to enable the bus arbitration mechanism in the bus interface circuit 46 and the cache coherency mechanism provided by the cache control circuit 52.

Thereafter, at block 162 the processor 12 disables the FERR, the IGNNE, and the A20M pins at the dual processor control circuit 64. At decision block 164, the processor 12 waits for the start-up processor interrupt (IPI) message from the processor 10 over the interrupt bus 30. After the start-up IPI is received from the processor 10, the processor 12 continues execution at state 166.

In the OEM processor mode at block 168, the processor 10 sets the internal most recent master mode (MRM) indicating that the processor 10 assumes immediate ownership as a bus master of the system bus 16. The MRM mode indicates that the processor 10 does not need to request control via the arbitration lines 34 to initiate transaction over the system bus 16.

At decision block 170, the processor 10 determines whether the serial identifier was received from the upgrade processor 12 over the HIT signal line of the cache control line 32. If the serial identifier was received at decision block 170, then control proceeds to block 172. At block 172, the processor 10 enables the bus arbitration functions of the bus interface circuit 46 and enables the cache coherency mechanisms provided by the cache control circuit 52. The bus arbitration and cache coherency mechanisms provide coordination between the OEM processor 10 and the upgrade processor 12 if the upgrade processor 12 is installed in the computer system 20.

At block 174, the processor 10 boots from the start-up address. For one embodiment the processor 10 boots by fetching an instruction from a fixed address according to the Intel microprocessor architecture.

Thereafter, at block 176 the processor 10 transmits the start-up interprocessor interrupt to the upgrade processor 12 over the interrupt bus 30. The start-up IPI starts up the upgrade processor 12 at decision block 164. Thereafter, the processor 10 continues execution at state 178.

The OEM and upgrade processors 10 and 12 provide an interlocked atomic cache flush operation. After the FLUSH signal is asserted, the upgrade processor 12 flushes the cache 70 and then relinquishes the system bus 16 to the OEM processor 10. The upgrade processor 12 waits for a special flush acknowledge bus cycle that indicates completion of a cache flush by the OEM processor 10 and then continues execution.

Figure 5:
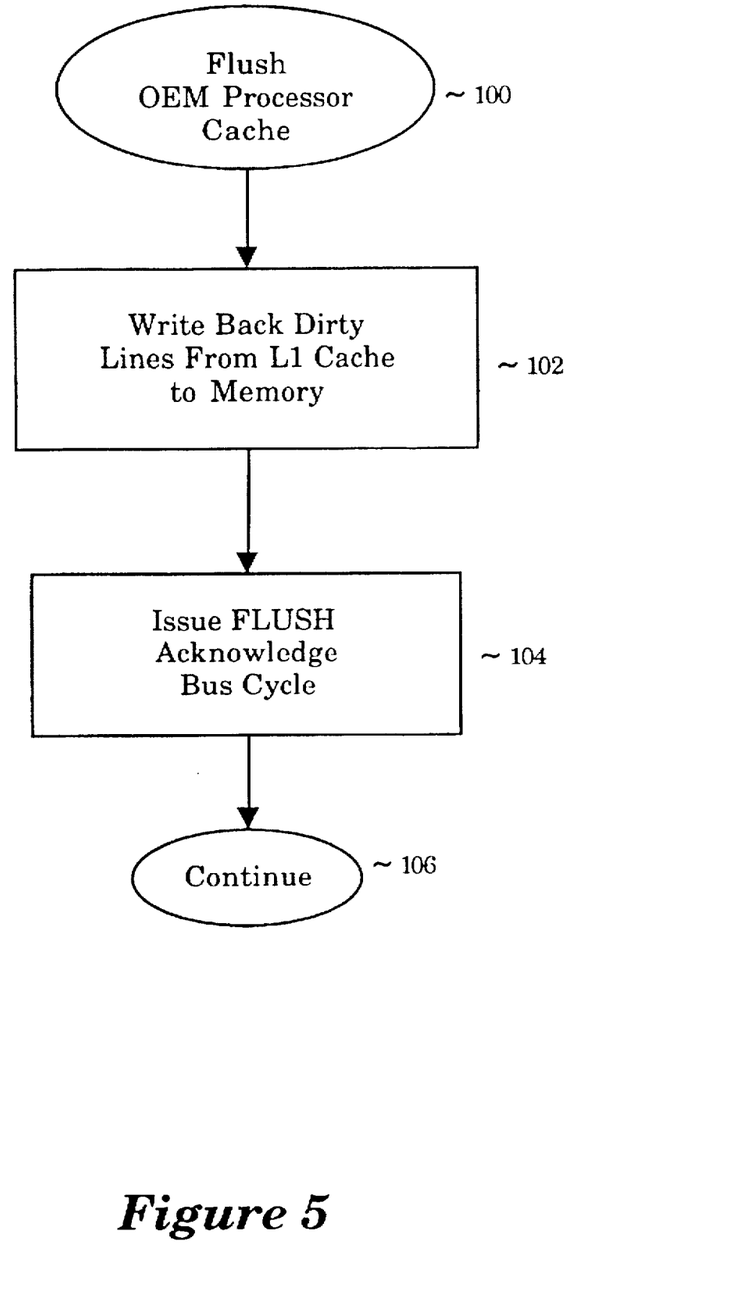
FIG. 5 is a flow diagram illustrating a cache flush operation by the OEM processor as determined by the CPU_TYPE pin for one embodiment.

FIG. 5 is a flow diagram illustrating an L1 cache flush operation by the OEM processor 10 as determined by the CPU_TYPE pin 22. At state 100, the FLUSH signal line of the cache control lines 32 is asserted to indicate the cache flush operation. At block 102, the processor 10 writes back any dirty lines from the internal L1 cache memory array 50 to the memory subsystem 14.

The cache control circuit 52 maintains a set of dirty tags for each cache line stored in the cache memory array 50 to determine the cache lines to write back to the memory subsystem 14 over the system bus 16. The processor 10 acquires control over the system bus 16 as bus master to write back the dirty lines to the memory subsystem 14.

Thereafter at block 104, the processor 10 issues a flush acknowledge bus cycle over the system bus 16 to indicate that the internal L1 cache of the processor 10 has been flushed to the external memory subsystem 14. At state 106, the processor 10 continues execution.

Figure 6:
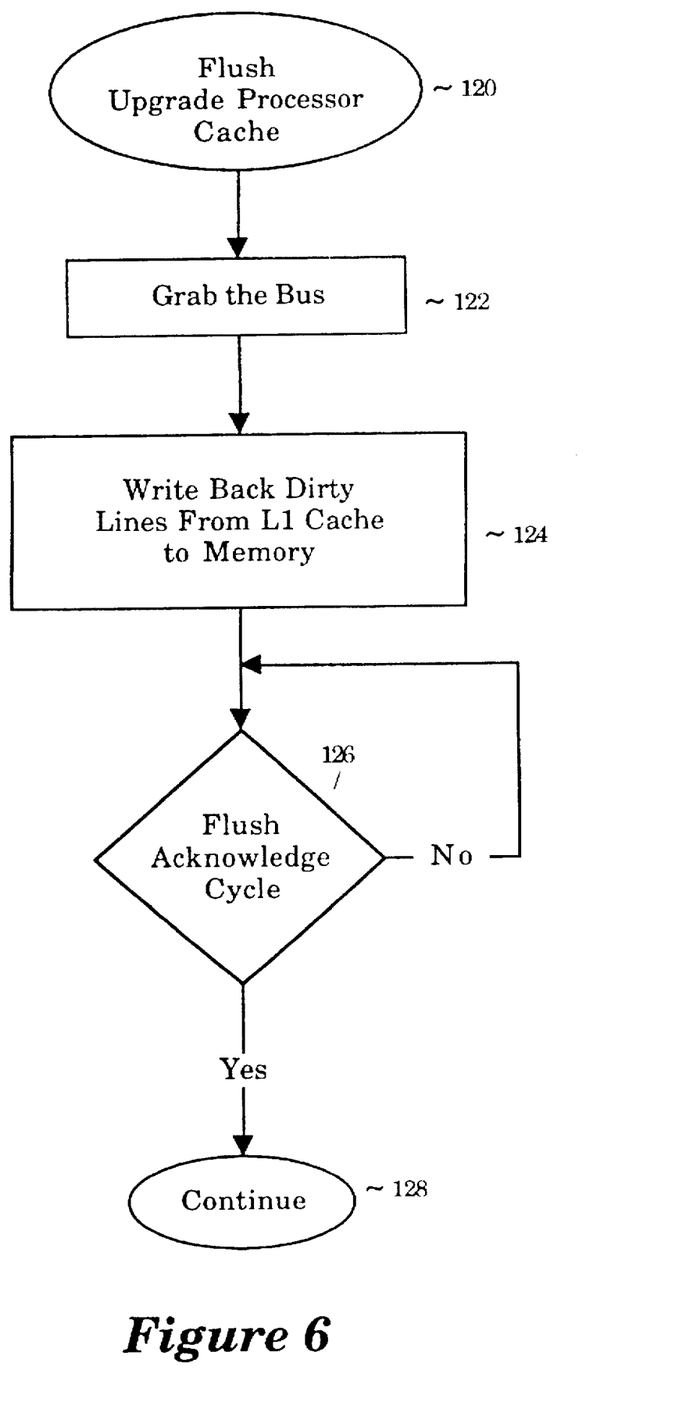
FIG. 6 is a flow diagram illustrating a cache flush operation by the upgrade processor as determined by the CPU_TYPE pin for one embodiment.

FIG. 6 is a flow diagram illustrating an L1 cache flush operation by the upgrade processor 12 as determined by the CPU_TYPE pin 24. At state 120, the FLUSH signal line of the cache control lines 32 is asserted to indicate the cache flush operation. At block 122, the processor 12 acquires control over the system bus 16 as a bus master.

Thereafter at block 124, the processor 12 writes back any dirty lines from the internal L1 cache memory array 70 to the memory subsystem 14 over the system bus 16. The cache control circuit 72 of the processor 12 maintains a set of tag bits that indicate the dirty lines that require transfer to the memory subsystem 14 during the flush operation.

At decision block 126, the processor 12 snoops the system bus 16 for the flush acknowledge cycle from the processor 10. The processor 12 loops at decision block 126 until the processor 10 completes a flush operation and issues the flush acknowledge cycle over the system bus 16 at block 104. Thereafter at state 128, the processor 12 continues execution.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded in an illustrative rather than a restrictive sense.

What is claimed is:

1. A computer system for operating in a plurality of modes, including a dual processor mode, comprising:
    a configurable processor including a central processing unit (CPU) type pin that receives a signal from the system, wherein a state of the signal causes the processor to be configured to operate as an original equipment manufacturer (OEM) processor or as an upgrade processor; and
    a plurality of system control lines that couple the processor to another processor that is identical to the processor, wherein the processor is configured via the CPU type pin to operate as an OEM processor and said another processor is configured via its own CPU type pin to operate as an upgrade processor, including an identifying signal pin configured to transmit a signal identifying the presence of said another processor to the processor.

2. The computer system of claim 1, wherein the state of the signal received by the CPU type pin determines whether the processor has ownership of a system bus at startup of the system, wherein the system bus is common to the processor and to said another processor.

3. The computer system of claim 2, further comprising dual processor control circuitry coupled to the system control lines to sample the state of the signal received on the CPU type pin and, in response, to determine whether the processor operates in a dual processor mode or a single processor mode.

4. The computer system of claim 3, wherein the processor is further coupled to said another processor by a plurality of cache control lines and a plurality of arbitration lines and wherein the processor further comprises:
   a bus arbitration mechanism coupled to the system bus and to the arbitration lines;
   a cache coherency mechanism coupled to the cache control lines; and
   a cache control circuit coupled to the cache coherency mechanism to receive a signal from said another processor on the identifying signal pin and, in response, to enable the bus arbitration mechanism and the cache coherency mechanism.

5. The computer system of claim 4, further comprising an interrupt identifier output transmitted to the system on the system bus, wherein when the dual processor control circuitry determines that the processor operates in a dual processor mode, the interrupt identifier output of the processor is changed to be an interrupt identifier different from an interrupt identifier of said another processor.

6. The computer system of claim 5, wherein when the dual processor control circuitry determines that the processor operates in a dual processor mode, communication over the plurality of system control lines is enabled.

7. A method for configuring a plurality of processors in a system to operate as an original equipment manufacturer (OEM) processor or as an upgrade processor, comprising the steps of:
   transmitting a signal to a first processor of the plurality of processors on a central processing unit (CPU) type pin of the first processor to cause the first processor to be configured as an OEM processor;
   transmitting a signal to a second processor of the plurality of processors on a CPU type pin of the second processor to cause the second processor to be configured as an upgrade processor; and
   transmitting a plurality of signals directly from the first processor to the second processor via communication lines coupling the first processor and the second processor.

8. The method of claim 2, further comprising the steps of:
   sampling an interrupt identifier signal from the first processor and, in response, determining that the first processor is configured to operate as an OEM processor; and
   sampling an interrupt identifier signal from the second processor and, in response, determining that the second processor is configured to operate as an upgrade processor.

9. The method of claim 8, further comprising the step of transmitting an identifying signal via the communication lines identifying the second processor to the first processor.

10. The method of claim 9, further comprising the steps of, in response to receipt of the identifying signal, enabling cache coherency and system bus arbitration mechanisms of the first processor.

11. The method of claim 10, further comprising the step of granting initial control of the system bus to the first processor.

12. A configurable processor usable in a multiprocessor computer system, comprising:
   a central processing unit (CPU) type pin configured to receive a configuration signal from the system, wherein the configuration signal causes the configurable processor to be configured to operate in an original equipment manufacturer (OEM) mode or an upgrade mode;
   a plurality of interprocessor signal lines that carry a plurality of signals directly from the configurable processor to another processor;
   processor core circuitry;
   dual processor control circuitry coupled to the processor core circuitry and to the plurality of interprocessor signal lines;
   a cache memory coupled to the processor core circuitry;
   a cache control circuit coupled to the cache memory and to the plurality of interprocessor signal lines;
   interrupt control circuitry coupled to the processor core circuitry and to the plurality of interprocessor signal lines; and bus interface circuitry coupled to the cache control circuitry.

13. The configurable processor of claim 12, further comprising an identifying signal that is transmitted via the interprocessor signal lines, wherein when the identifying signal is received by the configurable processor, communication is enabled over the interprocessor signal lines between the configurable processor and another processor that transmitted the identifying signal.

* * * * *